United States Patent
Figueiredo et al.

(10) Patent No.: US 10,425,964 B2
(45) Date of Patent: Sep. 24, 2019

(54) SYSTEMS AND METHODS OF PERFORMING A LISTEN-BEFORE-TALK (LBT) RADIO PROTOCOL

(71) Applicant: Telefonaktiebolaget L M Ericsson (publ), Stockholm (SE)

(72) Inventors: Daniel Figueiredo, Stockholm (SE); Håkan Andersson, Linköping (SE); Ashim Biswas, Sollentuna (SE); Jonas Fröberg Olsson, Ljungsbro (SE); Damanjit Singh, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 635 days.

(21) Appl. No.: 14/902,918

(22) PCT Filed: Nov. 20, 2015

(86) PCT No.: PCT/EP2015/077233
§ 371 (c)(1),
(2) Date: Jan. 5, 2016

(87) PCT Pub. No.: WO2016/119944
PCT Pub. Date: Aug. 4, 2016

(65) Prior Publication Data
US 2016/0381707 A1    Dec. 29, 2016

Related U.S. Application Data

(60) Provisional application No. 62/109,904, filed on Jan. 30, 2015.

(51) Int. Cl.
*H04W 76/18* (2018.01)
*H04W 76/19* (2018.01)
(Continued)

(52) U.S. Cl.
CPC ....... *H04W 74/0808* (2013.01); *H04W 16/14* (2013.01); *H04W 48/18* (2013.01);
(Continued)

(58) Field of Classification Search
CPC ..... H04W 48/18; H04W 36/14; H04W 74/08; H04W 74/0816; H04W 74/0825;
(Continued)

(56) References Cited

U.S. PATENT DOCUMENTS 9,629,181 B1 * 4/2017 Hart .................. H04W 74/04
2004/0127176 A1   7/2004 Rozhavsky et al.
(Continued)

FOREIGN PATENT DOCUMENTS

WO    2014064322 A1    5/2014

OTHER PUBLICATIONS

Author Unknown IEEE 802.11, 2007, pp. 1-1184.*
(Continued)

*Primary Examiner* — Christopher M Crutchfield
(74) *Attorney, Agent, or Firm* — Sage Patent Group (57) ABSTRACT

Systems and methods of performing a listen-before-talk (LBT) radio protocol in a communication system are provided. In one exemplary embodiment, a method (600) by a radio component (403, 503) of a wireless device (400, 500) may include receiving (601), by the radio component, from a baseband component (401, 501) of the wireless device, transmit data during a transmit-time interval associated with a synchronous wireless communication system. Further, the method may include, detecting (603), by the radio component, that a medium associated with an asynchronous communication system is available. Also, in response to detecting, the method may include, transmitting (605), by the radio component, the transmit data on the medium during the transmit-time interval.

18 Claims, 8 Drawing Sheets

(51) Int. Cl.
    *H04W 24/04* (2009.01)
    *H04W 36/08* (2009.01)
    *H04W 36/30* (2009.01)
    *H04L 1/00* (2006.01)
    *H04W 74/08* (2009.01)
    *H04W 56/00* (2009.01)
    *H04W 72/04* (2009.01)
    *H04W 48/18* (2009.01)
    *H04W 16/14* (2009.01)

(52) U.S. Cl.
    CPC ..... *H04W 56/001* (2013.01); *H04W 72/0446* (2013.01); *H04W 74/0816* (2013.01)

(58) Field of Classification Search
    CPC . H04W 88/06; H04W 76/15; H04W 72/1215; H04L 12/5692; H04L 5/001
    See application file for complete search history.

(56) References Cited

U.S. PATENT DOCUMENTS

| | | | | |
|---|---|---|---|---|
| 2009/0141737 | A1* | 6/2009 | Ho | H04L 12/413 370/447 |
| 2010/0203847 | A1* | 8/2010 | Gorbachov | H03H 7/38 455/84 |
| 2012/0057492 | A1* | 3/2012 | Goel | H04W 72/04 370/252 |
| 2015/0373652 | A1* | 12/2015 | Dabeer | H04W 52/246 455/522 |
| 2015/0373682 | A1* | 12/2015 | Bashar | H04L 5/0005 370/330 |
| 2016/0128098 | A1* | 5/2016 | Nagasaka | H04W 76/10 370/329 |

OTHER PUBLICATIONS

Ericsson, "Initial discussion on solutions for identified LAA functionalities", 3GPP TSG RAN WG1 Meeting #78bis, Ljubljana, Slovenia, Oct. 6, 2014, pp. 1-3, R1-144267, 3GPP.

Ericsson, "Details of Listen-Before-Talk LAA", 3GPP TSG RAN WG1 Meeting #79, San Francisco, US, Nov. 17, 2014, pp. 1-7, R1-145193, 3GPP.

IEEE Standards Association, "IEEE Standard for Information Technology—Telecommunication and information exchange between systems; Local and Metropolitan Area Networks—Specific Requirements; Part 11: Wireless LAN Medium Access Control (MAC) and Physical Layer (PHY) Specifications", IEEE Std 802.11-2012 (Revision of IEEE Std 802.11-2007), Mar. 29, 2012, pp. 1-2695, IEEE.

European Telecommunications Standards Institute, "Broadband Radio Access Networks (BRAN); 5 GHz high performance RLAN; Harmonized EN covering the essential requirements of article 3.2 of the R&TTE Directive", Draft ETSI EN 301 893 V1.7.2, Jul. 1, 2017, pp. 1-95, ETSI.

IEEE Standards Association, "IEEE Standard for Information technology—Telecommunications and information exchange between systems Local and metropolitan area networks—Specific requirements. Part 11: Wireless LAN Medium Access Control (MAC) and Physical Layer (PHY) Specifications", IEEE Std 802.11-2012 (Revision of IEEE Stsd802.11-2007), Approved Feb. 6, 2012, pp. 1-2793, IEEE Computer Society.

EP Office Action, dated Jul. 5, 2019, in connection with European Patent Application No. EP15798081.4, 5 pages.

* cited by examiner

SYSTEMS AND METHODS OF PERFORMING A LISTEN-BEFORE-TALK (LBT) RADIO PROTOCOL

RELATED APPLICATIONS

This application claims priority to U.S. Provisional Patent Application Ser. No. 62/109,904, filed Jan. 30, 2015, which is hereby incorporated by reference as if fully set forth herein.

FIELD OF DISCLOSURE

This application generally relates to wireless communications and more specifically to systems and methods of performing a listen-before-talk (LBT) radio protocol.

BACKGROUND

The IEEE 802.11 standard provides a set of Media Access Control (MAC) and Physical layer (PHY) specifications for implementing WLAN computer communication in the 2.4 gigahertz (GHz), 3.6 GHz, five (5) GHz, and sixty (60) GHz frequency bands. This standard is created and maintained by the IEEE Standards Committee IEEE 802. The base version of this standard was released in 1997 and has had subsequent amendments. This standard and its amendments provide the basis for wireless network products using the Wi-Fi bands.

A wireless local-area network (WLAN) links two or more devices using a wireless distribution method, and usually provides a connection through an access point (AP) to the wider Internet. This provides users the ability to move within a local coverage area and still be connected to the WLAN. All devices that may connect in a WLAN are referred to as a wireless station. A wireless station falls into one of two categories: an access point (AP) and a wireless client. An access point, which is typically a router, is a base station for a WLAN.

An access point transmits and receives signals at radio frequencies for wireless clients. A wireless client may be a mobile device such as a laptop, a personal digital assistant (PDA), an IP-phone, a smartphone or the like, or it may be a fixed device such as a desktop computer, a workstation or the like that is equipped with a wireless network interface. The IEEE 802.11 standard provides two basic modes of operation: an ad hoc mode and an infrastructure mode. In the ad hoc mode, a wireless client communicates directly peer-to-peer. In the infrastructure mode, a wireless client communicates through an access point that serves as a bridge to another network such as the Internet, a Local-Area Network (LAN) or the like.

A Wi-Fi system based on the IEEE 802.11 standard has many aspects in common with cellular systems. However, one difference is associated with the MAC protocol, which for a cellular system is typically scheduled, but for a Wi-Fi system is contention-based. This means that a receiving station does not know in advance from which transmitting station it will receive data as well as the format of the data.

The basic IEEE 802.11 MAC, the so-called Distributed Coordination Function (DCF), uses a Carrier-Sense Multiple Access with Collision Avoidance (CSMA/CA)-based MAC. The same protocol is applied by all stations including access points, i.e., in both downlink and uplink transmissions. This standard also supports a Point Coordination Function (PCF) mode, in which access points have more control over the medium usage. Supporting the PCF mode is however optional, and rarely implemented.

Figure 1:
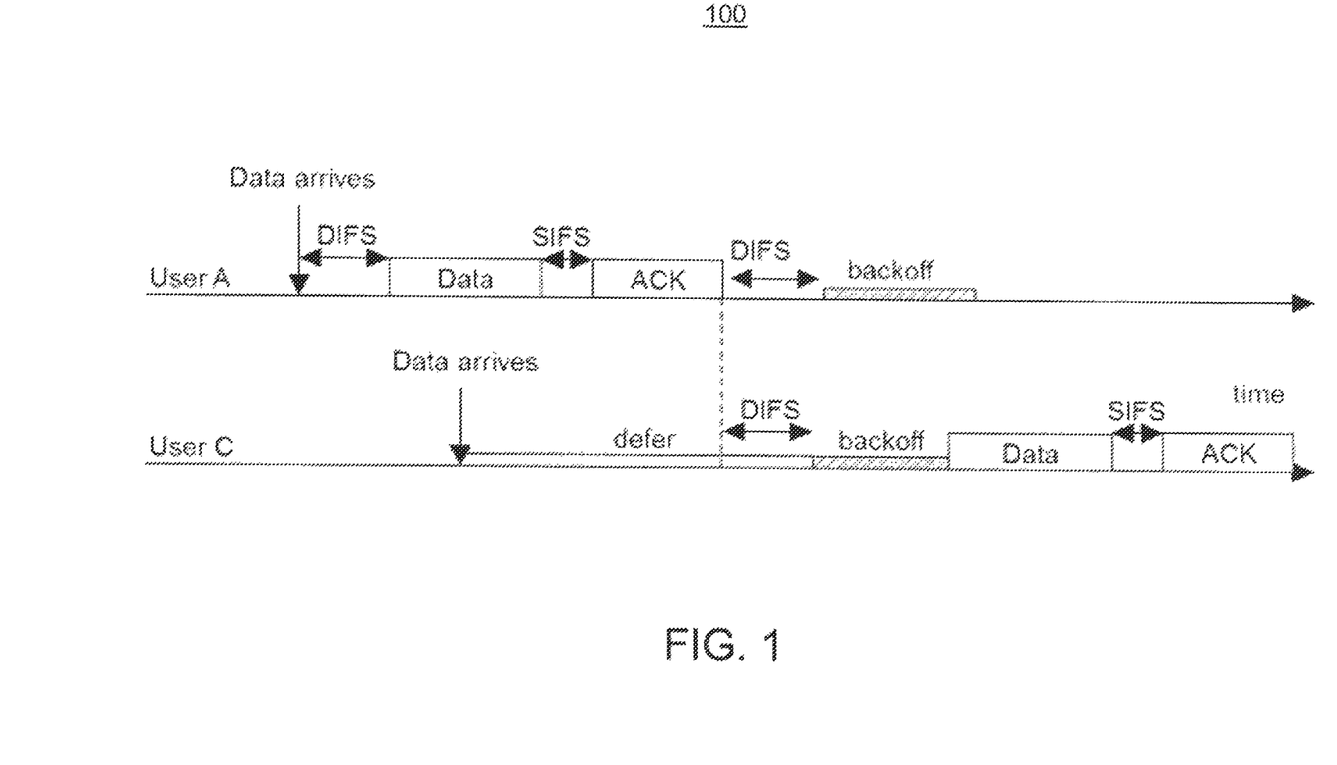
FIG. 1 illustrates a distributed coordination function (DCF).

FIG. 1 illustrates a distributed coordination function (DCF) 100. In FIG. 1, a station using a DCF mode, User A, and wishing to transmit a frame of data must first sense a medium. If the medium is sensed to be idle for a certain minimum time, i.e. during a so-called Distributed Inter-Frame Space (DIFS), the data frame is transmitted. The DIFS is fifty microseconds (50 µs) in the release IEEE 802.11b standard.

In FIG. 1, if the medium is busy, as it is for user C, the station first waits until the medium is sensed to be idle, as represented by the reference "defer." When this occurs, the station additionally defers the transmission during a DIFS. Since an immediate transmission may lead to collisions if more than one station is waiting until the medium is sensed idle, the station sets a back-off timer to a random delay and transmits only when this back-off timer has expired, instead of transmitting immediately when the medium is sensed idle. The back-off timer is only activated when the medium is sensed idle. Whenever the medium is sensed busy, a deferral state is entered in which the back-off timer is not activated. When the back-off timer expires, the data frame is transmitted.

If the data frame is successfully received by a station, the receiving station responds with an acknowledgement to the transmitting station. The acknowledgement is sent a Short Inter-Frame Space (SIFS) after the data frame is received. The SIFS is ten microseconds (10 µs) in the release IEEE 802.11b standard. Since SIFS is shorter than DIFS, no other station will access the medium during this time. If no acknowledgement is received by the transmitting station, the transmitting station generates a new back-off timer value, and retransmits the frame when the new back-off timer has expired.

The reason for not receiving any acknowledgement may be because either the transmitted data frame is lost, resulting in no acknowledgement being returned, or because the acknowledgement itself is lost. Even if the data frame is successfully acknowledged, the transmitting station must generate a back-off timer value and wait for it to expire before transmitting the next frame. This is to enable other stations to grab the channel.

To avoid congestion when collisions occur, back-off timer values are drawn from distributions with larger and larger expected values for every retransmission attempt. For the $n^{th}$ transmission attempt, the back-off timer value is drawn from the uniform distribution $U[0, \min((CW_{min})^{2n-1}-1, CW_{max}]$. $CW_{min}$ and $CW_{max}$ are constants with values depending on the physical layer. For the release IEEE 802.11b standard, $CW_{min}$ is thirty-one (31) and $CW_{max}$ is one thousand and twenty-three (1023). The back-off timer value is measured in units of slot times, which for the release IEEE 802.11b standard are twenty microseconds (20 µs).

In the Enhanced DCF mode, defined in the release IEEE 802.11e standard, service prioritization is introduced. This is done by using back-off and deferral parameters that depend on service type.

Since frames are transmitted after a DIFS when the medium is free, the minimum delay is equal to the transmission time plus a DIFS, which for release IEEE 802.11b is about one millisecond (1 ms) for a fifteen hundred (1500) byte data frame. The almost immediate acknowledgement, with a transmission time of around one-tenth of a millisecond (0.1 ms), means that the Round-Trip Time (RTT) on layer 2 is on the order of one millisecond (1 ms).

Because of the back-off and deferral times between transmissions, the medium is not fully used even at high traffic loads. The maximum link utilization reached depends on the frame size, and varies from fifty percent (50%) for voice, to seventy percent (70%) to eighty percent (80%) for data.

Licensed-Assisted Access, Long-Term Evolution (LAA-LTE) is one of the main work items for the LTE Release 13 standard under the umbrella of 3GPP. It proposes to use unlicensed bands (e.g. 2.4 GHz and 5.1 GHz) for LTE or LTE-like transmission in coexistence with other wireless standards (like WLAN IEEE 802.11 and Bluetooth). The primary channel of LTE in the licensed band serves as the main connection while secondary carrier(s) are set up in unlicensed bands to boost the throughput to the user. Most of today's available unlicensed bands are used by WLAN and the collisions between both systems may significantly reduce performance on both.

Especially in the five gigahertz (5 GHz) unlicensed spectrum bands, there is a multitude of channels available which could be used for LTE transmission if a suitable coexistence protocol is designed. Such a protocol must not only cope with coexistence with WiFi, but also handle coexistence between LTE networks from different operators all trying to use the unlicensed spectrum.

WiFi is asynchronous, as opposed to LTE, since WiFi transmissions may happen at any time if the channel is free. Moreover, the transmissions have a variable size which is signaled in the preamble of the WiFi data frame. However, LTE transmissions follow a rigid frame structure and are required to be aligned to the Transmission-Time Interval (TTI) of one millisecond (1 ms). Both the transmitter and the receiver of the wireless device are aligned to the TTI and the duration of transmission is in quanta of this TTI.

An important feature in LAA-LTE, not present in WiFi, is the possibility of the licensed carrier to be used as a control channel for grants, acknowledgments and the like, while off-loading the data to the secondary channel, if available. This may allow more users on the licensed spectrum where they may benefit from the multi-user capabilities of the LTE system, while the off-loaded data is transmitted using "best effort" without scheduling but with the added benefit of utilizing the LTE carrier for robust control signaling.

Listen-Before-Talk (LBT) is a protocol where the desired channel on the wireless medium is first sensed for any potentially interfering transmissions before a transmission begins. If the medium is found free, then the transmitter may start using it. Together with a back-off mechanism, an LBT protocol potentially avoids collisions. See for example the Load-Based Equipment (LBE) protocol described in ETSI EN 301 893 V1.7.2 (2014 July), entitled "Broadband Radio Access Networks (BRAN); 5 GHz high performance RLAN; Harmonized EN covering the essential requirements of article 3.2 of the R&TTE Directive." The IEEE 802.11 standard uses another such method called CSMA/CA (Channel-Sensing Multiple Access/Collision Avoidance). See IEEE Std 802.11-2012 (Revision of IEEE Std 802.11-2007) (IEEE 29 Mar. 2012), entitled "Part 11: Wireless LAN Medium Access Control (MAC) and Physical Layer (PHY) Specifications." This along with DCF, as described in Part 11 of IEEE Std 802.11-2012, forms a way of avoiding collisions.

The LBT protocols usually consist of a number of steps that include: Listen to medium—measure the received signal with procedures such as Clear-Channel Assessment (CCA); Decision of medium busy/free—based on energy detection and/or decoding of signal; and Start transmission—if medium is free or after a defined back-off period, the system starts transmission.

Currently in LTE, the radio is, at least conceptually, a simple device. It transforms the baseband signal it receives from Layer 1 into a radio transmission in a predefined frequency band. There is also a delay from the time that the Layer 2-based scheduler has assembled the signal until it reaches the radio and, subsequently, appears on the medium. This is typically on the order of one millisecond (1 ms) to two milliseconds (2 ms) in LTE. There is no channel sensing in LTE, but rather it is the responsibility of the scheduler to make sure there are no collisions on the channel. The strict synchronicity of all transmissions to TTIs/subframes makes this possible.

One of the problems with existing solutions is that there may be no mechanism in LTE networks for the radio to perform channel sensing in a fast way adapted to operate in unlicensed bands with existing technologies such as WiFi. In other words, current mechanisms for LTE systems may not transition from receiving or sensing to transmitting fast enough (<15 µs) to grab the channel in the WiFi bands. Hence, an LBT-functionality suitable for the WiFi band is difficult to achieve. Accordingly, there is a need for techniques to improve performing a listen-before-talk (LBT) protocol in a wireless device. Furthermore, other desirable features and characteristics of the present disclosure may become apparent from the subsequent detailed description and claims, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

In one exemplary embodiment, a method by a radio component of a wireless device may include receiving, by the radio component, from a baseband component of the wireless device, transmit data during a transmit-time interval associated with a synchronous wireless communication system. Further, the method may include detecting, by the radio component, that a medium associated with an asynchronous communication system is available. Also, in response to detecting, the method may include, transmitting, by the radio component, the transmit data on the medium during the transmit-time interval.

In another exemplary embodiment, the method may include receiving, by the radio component, from the baseband component, a first indication associated with enabling a channel-sensing mechanism of the radio component. Further, the method may include, in response to the first indication, enabling the channel-sensing mechanism. Also, the method may include receiving, from the channel-sensing mechanism, a second indication that the medium associated with the asynchronous communication system is available. In response to the second indication, the method may include sending, to a transmitter of the radio component, a third indication to transmit the transmit data on the medium during the transmit-time interval.

In another exemplary embodiment, the method may include, in response to the second indication, sending, to a power amplifier of the radio component, a fourth indication to enable the power amplifier.

In another exemplary embodiment, a time from receiving the first indication to sending the third indication may be less than the transit time interval.

In another exemplary embodiment, a time from receiving the second indication to sending the third indication may be no more than about fifteen microseconds (15 µs).

In another exemplary embodiment, a time from receiving the second indication to sending the third indication may be in a range from about one microsecond (1 µs) to about fifteen microseconds (15 µs).

In another exemplary embodiment, the method may include receiving, from the baseband component, a fifth indication associated with enabling a channel-sensing mechanism of the radio component. In response to the fifth indication, the method may include enabling the channel-sensing mechanism. Further, the method may include receiving, from the baseband component, a sixth indication that the medium associated with the asynchronous communication system is available. In response to the sixth indication, the method may include determining to refrain from transmitting the transmit data.

In another exemplary embodiment, the method may include transmitting, by a transmitter of the radio component, the transmit data on the medium during the transmit-time interval.

In another exemplary embodiment, the method may include enabling a power amplifier of the radio component.

In another exemplary embodiment, the synchronous wireless communication system may be associated with the long-term evolution (LTE) standard.

In another exemplary embodiment, the asynchronous wireless communication system may be associated with the 802.11 standard.

In another exemplary embodiment, the transmit-time interval may be about one millisecond (1 ms).

In another exemplary embodiment, the wireless device may support licensed-assisted access, long-term evolution (LAA-LTE) operation.

In another exemplary embodiment, the medium may be associated with unlicensed frequency bands.

In another exemplary embodiment, the medium may be associated with at least one of a 2.4 gigahertz (2.4 GHz) band and a 5.1 gigahertz (5.1 GHz) band.

In another exemplary embodiment, a wireless device for performing a listen-before talk protocol may include a baseband component and a radio component. The radio component may be operationally coupled to the baseband component. The radio component may be configured to receive, from the baseband component, transmit data during a transmit-time interval associated with a synchronous wireless communication system. The radio component may be configured to detect that a medium associated with an asynchronous communication system is available. In response to detecting that the medium associated with the asynchronous communication system is available, the radio component may be configured to transmit the transmit data on the medium during the transmit-time interval.

In some embodiments, the wireless device including the baseband component and the radio component may be configured to operate as described above using any functional means or units.

In another exemplary embodiment, the radio component may include a power amplifier. In response to detecting that the medium associated with the asynchronous communication system is available, the radio component may be configured to enable the power amplifier.

In another exemplary embodiment, the radio component may include a channel-sensing mechanism, a transmitter and a controller. The transmitter may be operationally coupled to the baseband component. The controller may be operationally coupled to the baseband component, the channel-sensing mechanism and the transmitter. The controller may be configured to receive, from the baseband component, a first indication associated with enabling the channel-sensing mechanism. In response to the first indication, the controller may be configured to enable the channel-sensing mechanism. Further, the controller may be configured to receive, from the channel-sensing mechanism, a second indication that the medium is available. In response to the second indication, the controller may be configured to send, to the transmitter, a third indication to transmit data on the medium during the transmit-time interval.

In another exemplary embodiment, the radio component may include a power amplifier coupled to the transmitter and the controller. The controller may be configured to send, to the power amplifier, an indication to enable the power amplifier.

In one exemplary embodiment, a wireless device may be configured to perform a listen-before-talk radio protocol in a communication system. Further, the wireless device may include means for receiving transmit data during a transmit-time interval associated with a synchronous wireless communication system. Also, the wireless device may include means for detecting that a medium associated with an asynchronous communication system is available. In response to detecting, the wireless device may include means for transmitting the transmit data on the medium during the transmit-time interval.

In another exemplary embodiment, the wireless device may include means for receiving a first indication associated with enabling a channel-sensing mechanism of the wireless device. In response to the first indication, the wireless device may include means for enabling the channel-sensing mechanism. Further, the wireless device may include means for receiving a second indication that the medium associated with the asynchronous communication system is available. In response to the second indication, the wireless device may include means for sending a third indication to transmit the transmit data on the medium during the transmit-time interval.

In another exemplary embodiment, the wireless device may include means for receiving a fifth indication associated with enabling a channel-sensing mechanism of the wireless device. In response to the fifth indication, the wireless device may include means for enabling the channel-sensing mechanism. Further, the wireless device may include means for receiving a sixth indication that the medium associated with the asynchronous communication system is available. In response to the sixth indication, the wireless device may include means for determining to refrain from transmitting the transmit data.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well-known methods and structures have not been described in detail so as not to unnecessarily obscure the present disclosure.

The present disclosure includes a description of a channel-sensing function implemented in a radio component coupled to a controller (a state machine) that may react to input from both a channel-sensing mechanism as well as commands from a scheduler of a baseband component such as at Layer 2. This may provide a fast reaction to a free medium or channel, which may be contemporaneously obtained by the radio component, with a scheduled transmission to follow.

One of the advantages of the present disclosure is that an LTE wireless device is able to sense and obtain a frequency channel associated with an asynchronous wireless communication system such as WiFi within a certain period of time to ensure that another wireless device does not begin transmitting on the same channel.

A further advantage of the present disclosure is that a wireless device may implement an LBT protocol in an LAA-LTE wireless communication system. A wireless device may refer to user equipment (UE), a smartphone, a mobile station (MS), a terminal, a cellular phone, a cellular handset, a personal digital assistant (PDA), a wireless phone, a wireless station, a wireless client, an organizer, a handheld computer, a desktop computer, a laptop computer, a tablet computer, a set-top box, a television, an appliance, a game device, a medical device, a display device, a wearable device, or the like.

Figure 2:
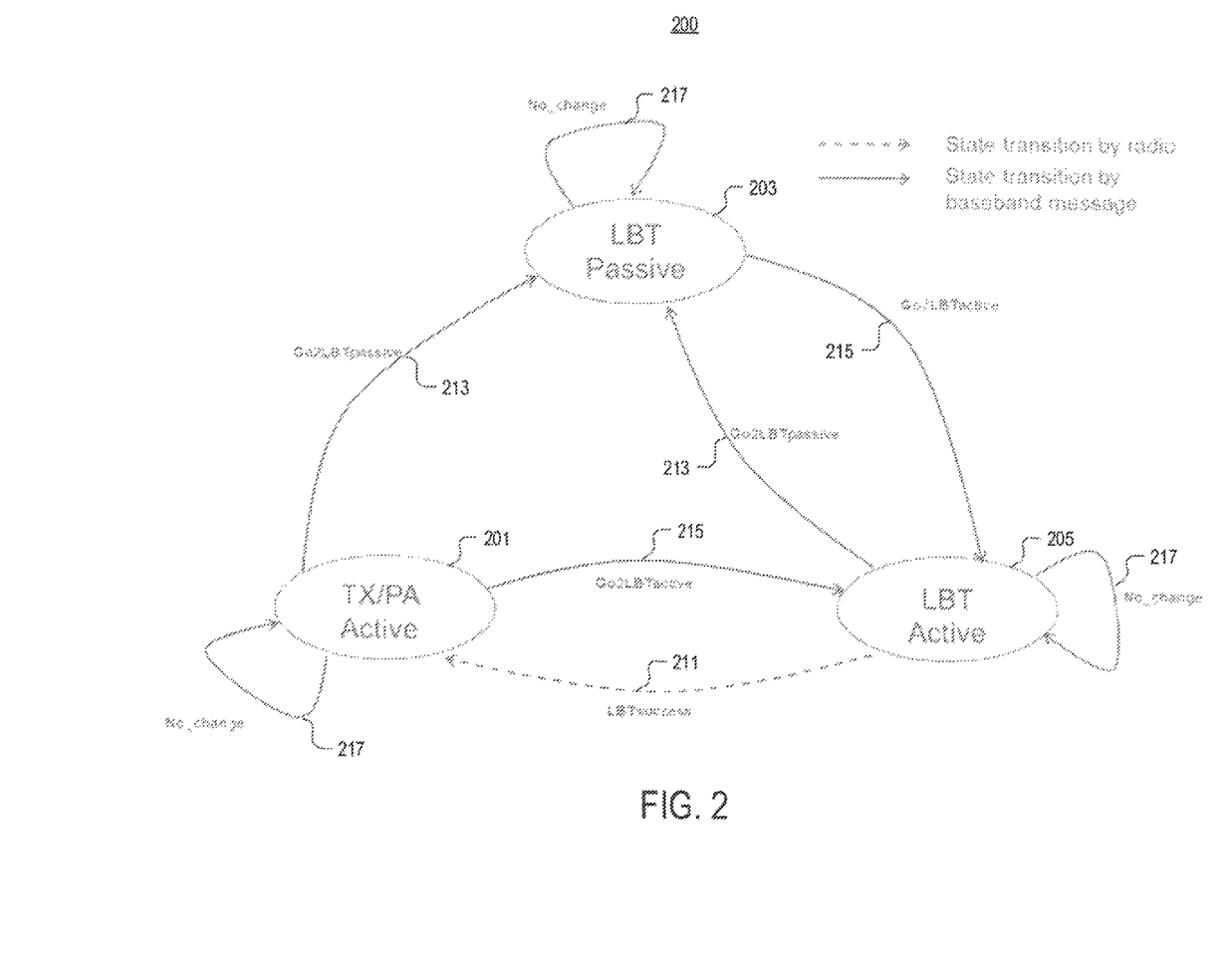
FIG. 2 provides a state-transition diagram of one embodiment of a listen-before-talk controller in accordance with various aspects described herein.

FIG. 2 provides a state-transition diagram of one embodiment of a listen-before-talk controller 200 of a wireless device in accordance with various aspects described herein. In one example, the listen-before-talk controller 200 may be implemented as a state machine. The controller 200 may be used to control a state of a radio component of the wireless device when preparing for a transmission. The radio component may be in a state corresponding to transmitting transmit data (a TX/PA active state 201), may be in a state corresponding to listening to a medium while the controller 200 is in a passive mode (an LBT passive state 203), or may be in a state corresponding to listening to a medium while the controller 200 is in an active mode (an LBT active state 205). In one definition, a medium is a communication channel used to convey a data signal from a sender to a receiver. In another definition, a medium is a radio channel.

The state changes of the controller 200 in the radio component may occur using commands from a baseband component of the wireless device or using an automatic trigger within the radio component. The commands from the baseband component to the radio component may be sent every transmit-time interval (TTI), which in LTE corresponds to one millisecond (1 ms). The baseband component may send LBT commands to the radio component contemporaneously with the transmit data. The LBT command may indicate a state of the radio component. A change of states in the radio component may also happen without a command from the baseband component. This may be required to achieve a fast transition from listening to the medium to occupying the medium by starting a transmission of the transmit data. Hence, a state change triggered and handled within the radio component is depicted by the dashed line in FIG. 2.

In FIG. 2, the controller 200 may be configured to include three states: the LBT passive state 203, the LBT active state 205 and the TX/PA active state 201. While in the LBT passive state 203, a radio component may listen to the medium for ongoing transmissions. Such process may consist of a clear-channel assessment (CCA), which assesses whether the medium can be used for communications. However, if the controller 200 detects a free medium, the controller 200 may not start transmission, but may continue in the listening mode.

The LBT active state 205: the radio component may listen to the medium for ongoing transmissions. Such a process may consist of a CCA. If the controller 200 detects a free medium, the controller 200 may change state automatically to the TX/PA active state 205 via an LBT Success event 211.

The TX/PA Active state 201: the system may transmit data. A power amplifier (PA) of the radio component may be turned on and the radio component may transmit data in the medium.

The commands from the baseband component may be triggered every TTI and may be transmitted to the radio component together with the transmit data for one subframe. These commands may include:

A Go2LBTpassive command 213: with origin at the LBT Active state 205 or the TX/PA Active state 217, this command may trigger the controller 200 to go to the LBT Passive state 203.

A Go2LBTactive command 215: with origin at the LBT Passive state 203 or the TX/PA Active state 201, this command may trigger the controller 200 to go to the LBT Active state 205.

No_change command 217: with origin at any of the three states 201, 203 and 205, this command may indicate that the controller 200 should remain in the current state.

The event that may automatically trigger a change of state without a message from the baseband component may include:

LBTsuccess event 211: this transition may be triggered if in the LBT Active state 205 and the listening process may identify that the medium is available for transmission. The radio component may then transition to the TX/PA Active state 201 and may start transmission on the medium.

Figure 3:
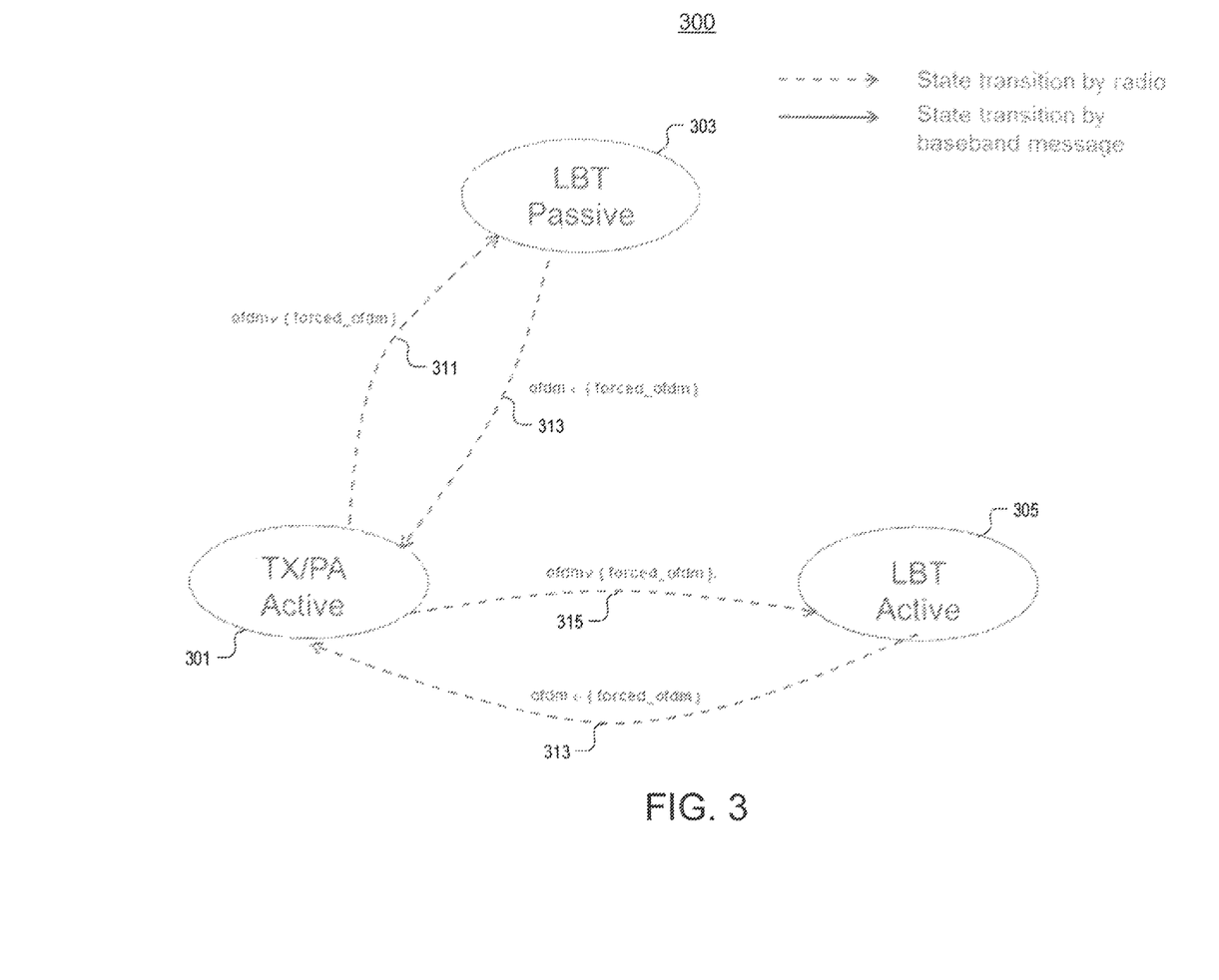
FIG. 3 provides a state-transition diagram of another embodiment of a listen-before-talk controller in accordance with various aspects described herein.

FIG. 3 provides a state-transition diagram of another embodiment of a listen-before-talk controller 300 in accordance with various aspects described herein. In FIG. 3, a Layer 2 of a baseband component of a wireless device may send a command to the controller 300 instructing a radio component of the wireless device to make a transition to a TX/PA Active state 301 during a specified time period and then may go back to a previous state 303 and 305 after this period. This may enable Layer 2 to delegate responsibility to make a desired state transition without having to send a message each time a state transition is required. For instance, the controller 300 may receive a command instructing the controller 300 to transition from an LBT Passive state 303 or an LBT Active state 305 to the TX/PA Active state 301 during a specified time period. This command may correspond to overriding a listen-before-talk mode of the radio component. Instead, the radio component may be placed into a transmit mode, such as an OFMD transmit mode, during a specified time period. The transmit mode of the radio component may correspond to the TX/PA Active state 301 of the controller 300. After the specified time period, the controller 300 may automatically place the radio component into the listen-before-talk mode by returning to the previous state 303 and 305. The listen-before-talk mode of the radio component may correspond to the LBT Passive state 303 or the LBT Active state 305 of the controller 300.

It will be appreciated that the systems and methods described herein may be combined or re-arranged in a variety of ways, and that the methods may be performed by one or more suitably programmed or configured processors or controllers and other known electronic circuits such as discrete logic gates interconnected to perform a specialized function, application-specific integrated circuits (ASICs) or the like. Many aspects of the present technology are described in terms of sequences of actions that may be performed, for example, by elements of a programmable computer system or a state machine. The steps, functions, procedures or blocks described herein may be implemented in hardware using any conventional technology, such as discrete circuit or integrated circuit technology, including both general-purpose electronic circuitry and application-specific circuitry. Alternatively, at least some of the steps, functions, procedures or blocks described herein may be implemented in software for execution by a suitable processor, controller or processing device such as a microprocessor, digital signal processor (DSP), state machine or any suitable programmable logic device such as a field-programmable gate array (FPGA) device or a programmable logic controller (PLC) device. It should also be understood that it may be possible to re-use the general processing capabilities of any device or unit in which the present technology is implemented. It may also be possible to re-use existing software such as by re-programming the existing software or by adding new software components.

Figure 4:
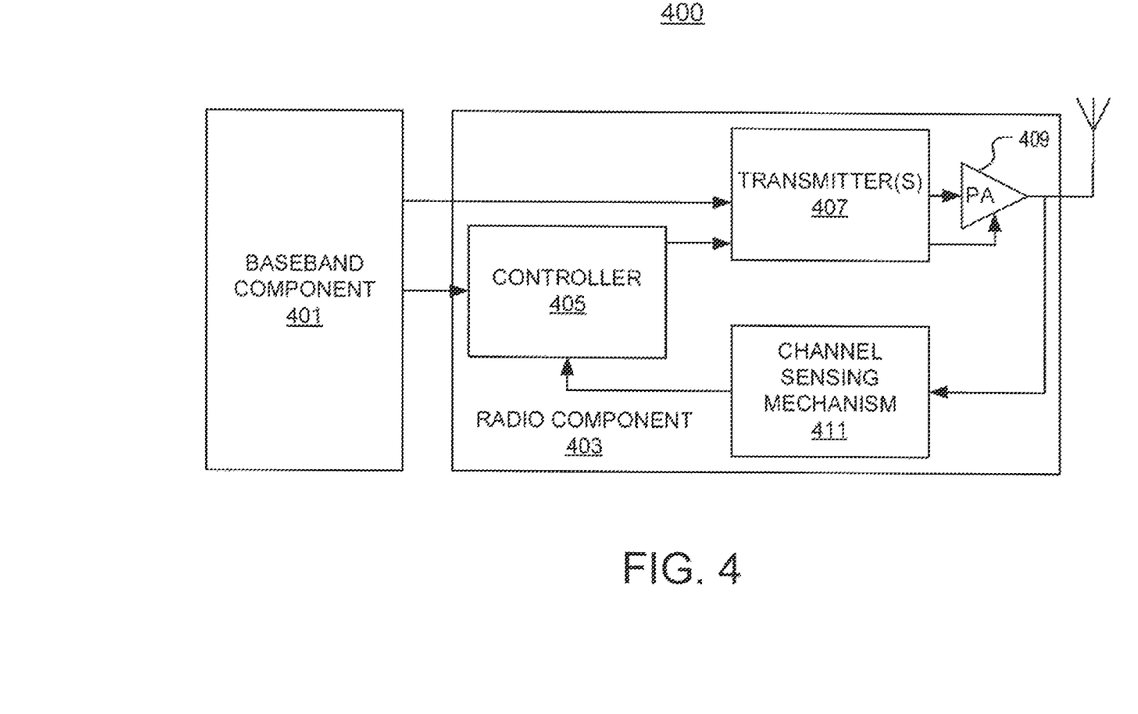
FIG. 4 provides a block diagram of one embodiment of a wireless device in accordance with various aspects described herein.

FIG. 4 provides a block diagram of one embodiment of a wireless device 400 in accordance with various aspects described herein. In FIG. 4, the wireless device 400 may be configured to include a baseband component 401 and a radio component 403. The baseband component 401 may be operationally coupled to the radio component. The radio component 401 may be configured to include a controller 405, one or more transmitters 407, one or more power amplifiers (PA) 409, a channel-sensing mechanism 411, and one or more antennas 413. A person of ordinary skill will recognize techniques for designing a radio component including elements thereof. The controller 405 may be operationally coupled to the baseband component 401, the one or more transmitters 405, and the channel-sensing mechanism 411. In one example, the one or more transmitters 407 may include a first transmitter configured to support an asynchronous wireless communication system and a second transmitter configured to support a synchronous wireless communication system. The channel-sensing mechanism 411 may be configured to detect that a medium associated with an asynchronous wireless communication system is available for transmission of transmit data by the radio component 403. A person of ordinary skill will readily recognize various techniques for designing a channel-sensing mechanism 411.

In FIG. 4, the controller 405 may be configured to control when transmit data provided by the baseband component 401 during a transmit-time interval is transmitted by the one or more transmitters 407 such as during the same transmit-time interval. Further, the controller 405 may be configured to receive an indication from the channel-sensing mechanism 411 that a medium associated with an asynchronous wireless communication system is available to transmit the transmit data by the one or more transmitters 407. In response to the controller 405 receiving the indication that the medium associated with the asynchronous wireless communication system is available, the controller 405 may send an indication to one of the transmitters 407 to transmit the transmit data on the medium associated with the asynchronous wireless communication system such as during the same transmit-time interval. Also, the controller 405 may be configured to receive communications from the baseband component 401 such as to place the radio component 403 into a certain functional state, to control certain functionality of the radio component 403, or the like.

In the current embodiment, the baseband component 401 may be configured to perform communication functions associated with a physical layer, a protocol stack or the like for one or more wireless communication systems. The protocol stack may include Layer 2 functionality, Layer 3 functionality, or the like. The communication functions may include data communication, voice communication, multimedia communication, short-range communications, near-field communication, location-based communication, another like communication function, or any combination thereof. In one example, the baseband component 401 may be configured to perform data-communication functions for a synchronous wireless communication system and an asynchronous wireless communication system.

Figure 5:
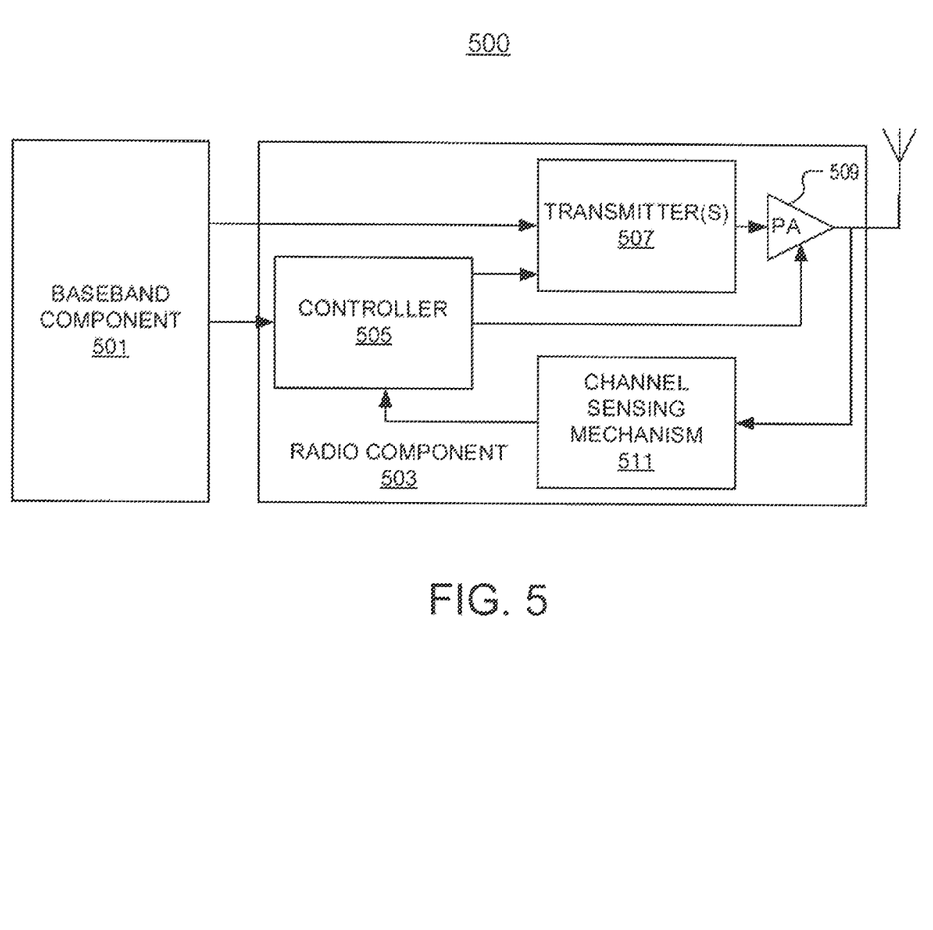
FIG. 5 provides a block diagram of another embodiment of a wireless device in accordance with various aspects described herein.

FIG. 5 provides a block diagram of another embodiment of a wireless device 500 in accordance with various aspects described herein. In FIG. 5, the wireless device 500 may be configured to include a baseband component 501 and a radio component 503. The baseband component 501 may be operationally coupled to the radio component 503. The radio component 503 may be configured to include a controller 505, a channel-sensing mechanism 511, one or more transmitters 507, and one or more power amplifiers (PA) 509. The controller 505 may be operationally coupled to the baseband component 501, the one or more transmitters 507, the one or more power amplifiers 509, and the channel-sensing mechanism 511. In one example, the one or more transmitters 507 may include a first transmitter configured to support an asynchronous wireless communication system and a second transmitter configured to support a synchronous wireless communication system. Similarly, the one or more power amplifiers 509 may include a first power amplifier configured to support an asynchronous wireless communication system and a second power amplifier configured to support a synchronous wireless communication system. The channel-sensing mechanism 511 may be configured to detect that a medium associated with an asynchronous wireless communication system is available for transmission of transmit data by the radio component 503. A person of ordinary skill in the art will readily recognize various techniques for designing a channel-sensing mechanism 511.

In FIG. 5, the controller 505 may be configured to control when transmit data provided by the baseband component 501 during a transmit-time interval is transmitted by the one or more transmitters 507 such as during the same transmit-time interval. Further, the controller 505 may be configured to receive an indication from the channel-sensing mechanism 511 that a medium associated with an asynchronous wireless communication system is available to transmit the transmit data by the transmitter(s) 507. In response to the controller 505 receiving the indication that the medium associated with the asynchronous wireless communication system is available, the controller 505 may send an indication to the transmitter(s) 507 associated with the asynchronous wireless communication system to transmit the transmit data on the medium such as during the same transmit-time interval. Further, the controller 505 may send an indication enabling the power amplifier 509 associated with the asynchronous wireless communication system such as during the same transmit-time interval. In addition, the controller 505 may be configured to receive communications from the baseband component 501 such as to place the radio component 503 into a certain functional state, to control certain functionality or elements of the radio component 503 or the like.

Figure 6:
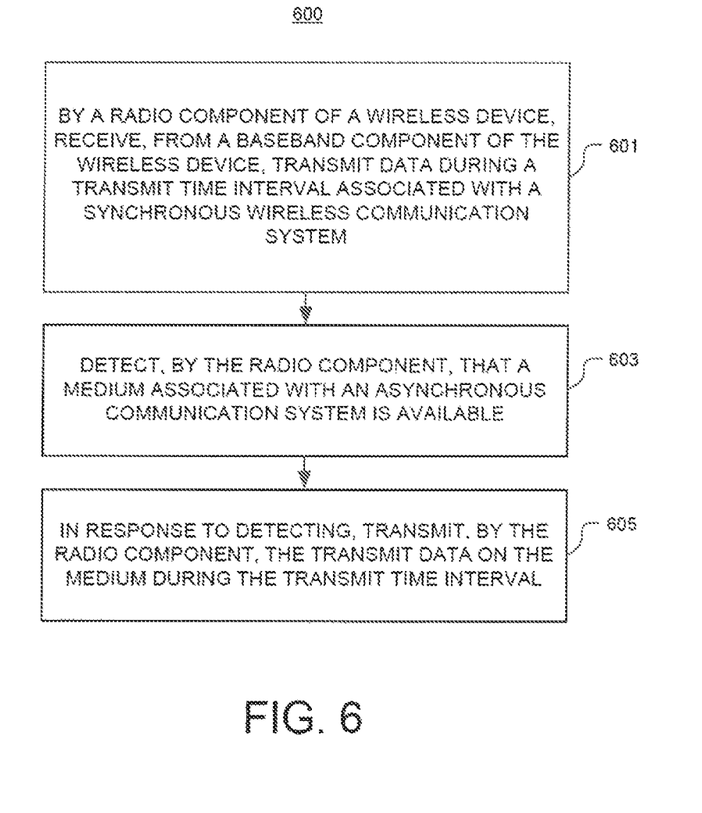
FIG. 6 provides a flow chart of one embodiment of a method of performing listen-before-talk protocol in a wireless device in accordance with various aspects described herein.

FIG. 6 provides a flow chart of one embodiment of a method 600 in a wireless device in accordance with various aspects described herein. In FIG. 6, the method 600 may be performed by a radio component of a wireless device. Further, the method 600 may start, for instance, at block 601, where it may include receiving, by the radio component, from a baseband component of the wireless device, transmit data during a transmit-time interval associated with a synchronous wireless communication system. At block 603, the method may include detecting, by the radio component, that a medium associated with an asynchronous communication system is available. At block 605, in response to detecting that the medium associated with the asynchronous communication system is available, the method may include transmitting, by the radio component, the transmit data on the medium during the transmit-time interval.

Figure 7:
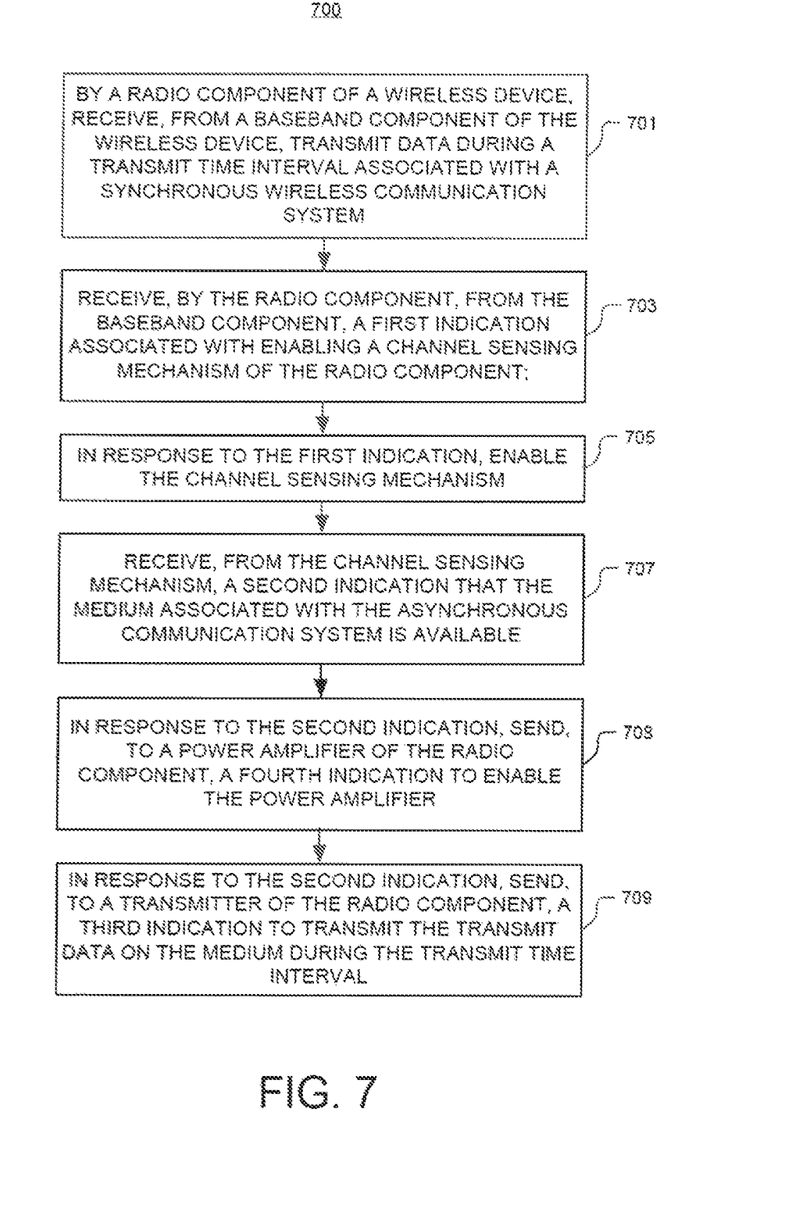
FIG. 7 provides a flow chart of another embodiment of a method of performing listen-before-talk protocol in a wireless device in accordance with various aspects described herein.

FIG. 7 provides a flow chart of another embodiment of a method of performing listen-before-talk (LBT) protocol in a wireless device in accordance with various aspects described herein. In FIG. 7, the method 700 may be performed by a radio component of a wireless device. Further, the method 700 may start, for instance, at block 701, where it may include receiving, by the radio component, from a baseband component of the wireless device, transmit data during a transmit-time interval associated with a synchronous wireless communication system. At block 703, the method 700 may include receiving, by the radio component, from the baseband component, a first indication associated with enabling a channel-sensing mechanism of the radio component. At block 705, in response to the first indication, the method 700 may include enabling the channel-sensing mechanism. At block 707, the method 700 may include receiving, from the channel-sensing mechanism, a second indication that the medium associated with the asynchronous communication system is available. At block 708, in response to the second indication, the method 700 may include sending, to a power amplifier of the radio component, a fourth indication to enable the power amplifier. At block 709, in response to the second indication, the method 700 may include sending, to a transmitter of the radio component, a third indication to transmit the transmit data on the medium during the transmit-time interval.

Figure 8:
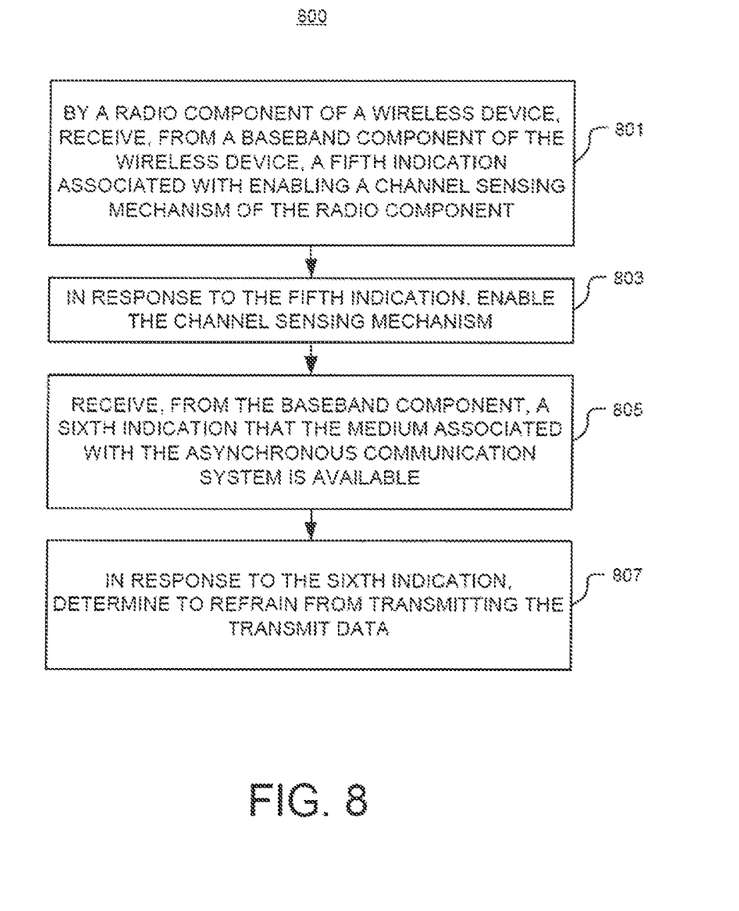
FIG. 8 provides a flow chart of another embodiment of a method of performing listen-before-talk protocol in a wireless device in accordance with various aspects described herein.

FIG. 8 provides a flow chart of another embodiment of a method 800 of performing listen-before-talk (LBT) protocol in a wireless device in accordance with various aspects described herein. In FIG. 8, the method 800 may be performed by a radio component of a wireless device. The method 800 may start, for instance, at block 801 where it may include receiving, from a baseband component of the wireless device, a fifth indication associated with enabling a channel-sensing mechanism of the radio component. At block 803, in response to the fifth indication, the method 800 may include enabling the channel-sensing mechanism. At block 805, the method 800 may include receiving, from the baseband component, a sixth indication that the medium associated with the asynchronous communication system is available. At block 807, in response to the sixth indication, the method 800 may include determining to refrain from transmitting the transmit data.

In one embodiment, a method by a radio component of a wireless device may include receiving, by the radio component, from a baseband component of the wireless device, transmit data during a transmit-time interval associated with a synchronous wireless communication system. Further, the method may include, detecting, by the radio component, that a medium associated with an asynchronous communication system is available. Also, in response to detecting, the method may include, transmitting, by the radio component, the transmit data on the medium during the transmit-time interval.

In another embodiment, the method may include receiving, by the radio component, from the baseband component, a first indication associated with enabling a channel-sensing mechanism of the radio component. Further, the method may include, in response to the first indication, enabling the channel-sensing mechanism. Also, the method may include receiving, from the channel-sensing mechanism, a second indication that the medium associated with the asynchronous communication system is available. In response to the second indication, the method may include sending, to a transmitter of the radio component, a third indication to transmit the transmit data on the medium during the transmit-time interval.

In another embodiment, the method may include, in response to the second indication, sending, to a power amplifier of the radio component, a fourth indication to enable the power amplifier.

In another embodiment, a time from receiving the first indication to sending the third indication may be less than the transit time interval.

In another embodiment, a time from receiving the second indication to sending the third indication may be no more than about fifteen microseconds (15 µs).

In another embodiment, a time from receiving the second indication to sending the third indication may be in a range from about one microsecond (1 µs) to about fifteen microseconds (15 µs).

In another embodiment, the method may include receiving, from the baseband component, a fifth indication associated with enabling a channel-sensing mechanism of the radio component. In response to the fifth indication, the method may include enabling the channel-sensing mechanism. Further, the method may include receiving, from the baseband component, a sixth indication that the medium associated with the asynchronous communication system is available. In response to the sixth indication, the method may include determining to refrain from transmitting the transmit data.

In another embodiment, the method may include transmitting, by a transmitter of the radio component, the transmit data on the medium during the transmit-time interval.

In another embodiment, the method may include enabling a power amplifier of the radio component.

In another embodiment, the synchronous wireless communication system may be associated with the long-term evolution (LTE) standard.

In another embodiment, the asynchronous wireless communication system may be associated with the 802.11 standard.

In another embodiment, the transmit-time interval may be about one millisecond (1 ms).

In another embodiment, the wireless device may support licensed-assisted access, long-term evolution (LAA-LTE) operation.

In another embodiment, the medium may be associated with unlicensed frequency bands.

In another embodiment, the medium may be associated with at least one of a 2.4 gigahertz (2.4 GHz) band and a 5.1 gigahertz (5.1 GHz) band.

In another embodiment, the baseband component may schedule a transmission of the transmit data on the synchronous wireless communication system.

In another embodiment, the radio component may determine to transmit the transmit data on the medium associated with the asynchronous wireless communication system and may determine to transmit the transmit data on a medium associated with the synchronous wireless communication system. The transmission of the transmit data on the medium associated with the asynchronous wireless communication system and the transmission of the transmit data on the medium associated with the synchronous wireless communication system may occur during the same transmit-time interval.

In another embodiment, the radio component may determine to transmit the transmit data on the medium associated with the asynchronous wireless communication system and may determine not to transmit the transmit data on a medium associated with the synchronous wireless communication system.

In another embodiment, the radio component may determine to transmit the transmit data on the medium associated with the asynchronous wireless communication system and may determine to transmit another transmit data on a medium associated with the synchronous wireless communication system. The transmission of the transmit data on the medium associated with the asynchronous wireless communication system and the transmission of the other transmit data on the medium associated with the synchronous wireless communication system may occur during the same transmit-time interval.

In another embodiment, a wireless device may include a baseband component and a radio component. The radio component may be operationally coupled to the baseband component. The radio component may be configured to receive, from the baseband component, transmit data during a transmit-time interval associated with a synchronous wireless communication system. The radio component may be configured to detect that a medium associated with an asynchronous communication system is available. In response to detecting that the medium associated with the asynchronous communication system is available, the radio component may be configured to transmit the transmit data on the medium during the transmit-time interval.

In another embodiment, the radio component may include a power amplifier. In response to detecting that the medium associated with the asynchronous communication system is available, the radio component may be configured to enable the power amplifier.

In another embodiment, the radio component may include a channel-sensing mechanism, a transmitter and a controller. The transmitter may be operationally coupled to the baseband component. The controller may be operationally coupled to the baseband component, the channel-sensing mechanism and the transmitter. The controller may be configured to receive, from the baseband component, a first indication associated with enabling the channel-sensing mechanism. In response to the first indication, the controller may be configured to enable the channel-sensing mechanism. Further, the controller may be configured to receive, from the channel-sensing mechanism, a second indication that the medium is available. In response to the second indication, the controller may be configured to send, to the transmitter, a third indication to transmit data on the medium during the transmit-time interval.

In another embodiment, the radio component may include a power amplifier coupled to the transmitter and the controller. The controller may be configured to send, to the power amplifier, an indication to enable the power amplifier.

In one embodiment, a wireless device may be configured to perform a listen-before-talk radio protocol in a communication system. Further, the wireless device may include means for receiving transmit data during a transmit-time interval associated with a synchronous wireless communication system. Also, the wireless device may include means for detecting that a medium associated with an asynchronous communication system is available. In response to detecting, the wireless device may include means for transmitting the transmit data on the medium during the transmit-time interval.

In another embodiment, the wireless device may include means for receiving a first indication associated with enabling a channel-sensing mechanism of the wireless device. In response to the first indication, the wireless device may include means for enabling the channel-sensing mechanism. Further, the wireless device may include means for receiving a second indication that the medium associated with the asynchronous communication system is available. In response to the second indication, the wireless device may include means for sending a third indication to transmit the transmit data on the medium during the transmit-time interval.

In another embodiment, the wireless device may include means for receiving a fifth indication associated with enabling a channel-sensing mechanism of the wireless device. In response to the fifth indication, the wireless device may include means for enabling the channel-sensing mechanism. Further, the wireless device may include means for receiving a sixth indication that the medium associated with the asynchronous communication system is available. In response to the sixth indication, the wireless device may include means for determining to refrain from transmitting the transmit data.

| Abbreviation | Explanation |
| --- | --- |
| CCA | Clear-Channel assessment |
| CTS | Clear-to-Send |
| DCF | Distributed Coordination Function |
| eNB | Enhanced NodeB |
| LAA-LTE | Licensed-Assisted Access for LTE |
| LBE | Load-based equipment |
| LBT | Listen-Before-Talk |
| QoS | Quality of Service |
| RTS | Request-to-Send |
| TTI | Transmission-Time Interval |
| UE | User Equipment |
| WLAN | Wireless Local-Area Network |

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used to perform a listen-before-talk (LBT) radio protocol. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD): a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to.

Although the present disclosure describes specific examples, embodiments, and the like, various modifications and changes may be made without departing from the scope of the present disclosure as set forth in the claims below. For example, although the example methods, devices, systems, or articles of manufacture described herein are in conjunction with performing a listen-before-talk (LBT) radio protocol, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications and variations that are within the spirit and scope of the claimed subject matter.

What is claimed is:

1. A method by a radio component of a wireless device for performing a listen-before-talk radio protocol in a communication system, the method comprising:
   receiving, by the radio component and from a baseband component of the wireless device, transmit data during a transmit-time interval associated with a synchronous wireless communication system;
   detecting, by the radio component, that a medium associated with an asynchronous communication system is available;
   in response to the detecting, the radio component transmitting the transmit data on the medium during the transmit-time interval, receiving, from the baseband component, a fifth indication associated with enabling a channel-sensing mechanism of the radio component;

in response to the fifth indication, enabling the channel-sensing mechanism;

receiving, from the baseband component, a sixth indication that the medium associated with the asynchronous communication system is available; and in response to the sixth indication, determining to refrain from transmitting the transmit data.

2. The method of claim 1, wherein receiving the transmit data includes:

receiving, by the radio component and from the baseband component, a first indication associated with enabling a channel-sensing mechanism of the radio component;

in response to the first indication, enabling the channel-sensing mechanism;

wherein the detecting that the medium is available includes:

receiving, from the channel-sensing mechanism, a second indication that the medium associated with the asynchronous communication system is available; and in response to the second indication, sending, to a transmitter of the radio component, a third indication to transmit the transmit data on the medium during the transmit-time interval.

3. The method of claim 2, wherein a time from receiving the first indication to sending the third indication is less than the transit time interval.

4. The method of claim 2, wherein a time from receiving the second indication to sending the third indication is no more than fifteen microseconds (15 μs).

5. The method of claim 2, wherein a time from receiving the second indication to sending the third indication is in a range from one microsecond (1 μs) to fifteen microseconds (15 μs).

6. The method of claim 2, wherein the detecting that the medium is available further includes:

in response to the second indication, sending, to a power amplifier of the radio component, a fourth indication to enable the power amplifier.

7. The method of claim 1, wherein the transmitting the transmit data on the medium during the transmit-time interval includes transmitting, by a transmitter of the radio component, the transmit data on the medium during the transmit-time interval.

8. The method of claim 1, wherein the transmitting the transmit data on the medium during the transmit-time interval includes enabling a power amplifier of the radio component.

9. The method of claim 1, wherein the synchronous wireless communication system is associated with the long-term evolution (LTE) standard.

10. The method of claim 1, wherein the asynchronous wireless communication system is associated with the 802.11 standard.

11. The method of claim 1, wherein the transmit-time interval is one millisecond (1 ms).

12. The method of claim 1, wherein the wireless device supports licensed-assisted access, long-term evolution (LAA-LTE) operation.

13. The method of claim 1, wherein the medium is associated with unlicensed frequency bands.

14. The method of claim 1, wherein the medium is associated with at least one of a 2.4 gigahertz (2.4 GHz) band and a 5.1 gigahertz (5.1 GHz) band.

15. A wireless device for performing a listen-before-talk radio protocol in a communication system, the wireless device comprising:

a baseband component;

a radio component operationally coupled to the baseband component, wherein the radio component is configured to:

receive, from the baseband component, transmit data during a transmit-time interval associated with a synchronous wireless communication system;

detect that a medium associated with an asynchronous communication system is available; and in response to detecting, transmit the transmit data on the medium during the transmit-time interval, receive, from the baseband component, a fifth indication associated with enabling the channel-sensing mechanism of the radio component;

in response to the fifth indication, enable the channel-sensing mechanism;

receive, from the baseband component, a sixth indication that the medium associated with the asynchronous communication system is available; and in response to the sixth indication, determine to refrain from transmitting the transmit data.

16. The wireless device of claim 15, wherein:

the radio component further includes a power amplifier;

the radio component is further configured to in response to detecting, enable the power amplifier.

17. The wireless device of claim 15, wherein the radio component further includes:

a channel-sensing mechanism;

a transmitter operationally coupled to the baseband component; and a control circuit operationally coupled to the baseband component, the channel-sensing mechanism and the transmitter, wherein the control circuit is configured to:

receive, from the baseband component, a first indication associated with enabling the channel-sensing mechanism;

in response to the first indication, enable the channel-sensing mechanism;

receive, from the channel-sensing mechanism, a second indication that the medium is available;

in response to the second indication, send, to the transmitter, a third indication to transmit data on the medium.

18. The wireless device of claim 17, wherein:

the radio component is further configured to include a power amplifier;

the control circuit is further configured to, in response to the second indication, send, to the power amplifier, a fourth indication to enable the power amplifier.

* * * * *